United States Patent
Miscopein et al.

(10) Patent No.: US 7,245,904 B2
(45) Date of Patent: Jul. 17, 2007

(54) RECONFIGURATION OF PROGRAMMABLE COMPONENTS IN AN ELECTRONIC APPARATUS

(75) Inventors: Benoît Miscopein, Grenoble (FR); Eric Batut, Vizille (FR)

(73) Assignee: France Telecom, Paris (FR)

( * ) Notice: Subject to any disclaimer, the term of this patent is extended or adjusted under 35 U.S.C. 154(b) by 5 days.

(21) Appl. No.: 10/495,504

(22) PCT Filed: Nov. 6, 2002

(86) PCT No.: PCT/FR02/03800

§ 371 (c)(1),
(2), (4) Date: May 13, 2004

(87) PCT Pub. No.: WO03/043303

PCT Pub. Date: May 22, 2003

(65) Prior Publication Data

US 2005/0009509 A1  Jan. 13, 2005

(30) Foreign Application Priority Data

Nov. 13, 2001 (FR) .................................. 01 14752

(51) Int. Cl.
*H04M 3/00* (2006.01)
*H04M 1/00* (2006.01)

(52) U.S. Cl. ....................... 455/418; 455/558

(58) Field of Classification Search ............. 455/186.1, 455/418–420, 558; 713/100; 710/104; 717/168, 717/173; 711/162
See application file for complete search history.

(56) References Cited

U.S. PATENT DOCUMENTS

| | | | | |
|---|---|---|---|---|
| 5,375,237 A | * | 12/1994 | Tanaka et al. | 707/102 |
| 5,400,389 A | * | 3/1995 | Niiyama et al. | 455/418 |
| 5,418,837 A | * | 5/1995 | Johansson et al. | 455/558 |
| 5,903,601 A | * | 5/1999 | Elnashar et al. | 375/220 |
| 6,085,268 A | * | 7/2000 | Lee et al. | 710/72 |
| 6,708,045 B1 | * | 3/2004 | Lieu et al. | 455/557 |
| 6,775,559 B1 | * | 8/2004 | Weghorst et al. | 455/558 |
| 2001/0049263 A1 | * | 12/2001 | Zhang | 455/67.1 |
| 2003/0093598 A1 | * | 5/2003 | Park | 710/63 |

FOREIGN PATENT DOCUMENTS

| | | |
|---|---|---|
| EP | 0 459 344 A | 12/1991 |
| WO | WO 9317512 A1 * | 9/1993 |
| WO | 00 40048 A | 7/2000 |

* cited by examiner

*Primary Examiner*—William Trost
*Assistant Examiner*—Marivelisse Santiago-Cordero
(74) *Attorney, Agent, or Firm*—Lowe Hauptman & Berner LLP

(57) ABSTRACT

For the reconfiguration of a radiotelephone unit including components programmable in configuration modes, the invention provides a removable electronic device having stored data defining a plurality of configuration modes which is connected to the apparatus. A configuration mode is selected from the apparatus in the device. The programmable components are programmed by the device and reconfigured in accordance with the selected configuration mode data under the control of the device. The data of the configuration modes can be downloaded from a server into the device through a downloader terminal.

2 Claims, 2 Drawing Sheets

RECONFIGURATION OF PROGRAMMABLE COMPONENTS IN AN ELECTRONIC APPARATUS

RELATED APPLICATIONS

The present application is based on PCT/FR2002/0380, filed Nov. 6, 2002, and claims priority to French Application Serial Number 01/14752, filed Nov. 13, 2001, the disclosure of both of which are hereby incorporated by reference herein in its entirety.

BACKGROUND OF THE INTENTION

1 Field of the Invention

The present invention relates to reconfiguring reprogrammable components in an electronic unit such as a telecommunication terminal, including a mobile telephone terminal.

For example, the configuration modes relate to telecommunication interfaces that adapt the unit to the telecommunication network to which it is liable to be connected temporarily as a function of the location of the unit.

2 Description of the Prior Art

One prior art solution for adapting the unit to diverse telecommunication interfaces is to provide different and independent hardware and software modules for implementing the diverse interfaces required and included in the terminal. If the unit must be connected to the telecommunication network corresponding to one of the interfaces incorporated in this way, the latter interface is selected and the other interfaces remain inactive.

Another and less bulky solution consists in interchanging one telecommunication interface module with another in the unit.

In these two prior art solutions, it is necessary to provide an interface module each time that a new telecommunication network or modifications to an existing network are defined and generally standardized.

OBJECT OF THE INVENTION

The present invention aims to remedy the drawbacks of the prior art solutions previously cited by exploiting the reprogrammable nature of certain components in the unit in order to authorize the user of the unit to select a configuration mode autonomously, without adding dedicated modules each time that a new configuration mode is created, whilst avoiding modification of the operating context of the unit.

SUMMARY OF THE INVENTION

Accordingly, a method for reconfiguring an electronic unit of cellular mobile telephone type comprising components programmable in configuration modes relating to radio communication interfaces, is characterized in that it comprises the steps of:

procuring an electronic device having stored data defining a plurality of configuration modes and connecting the device to the unit, saving operating context data in the unit following a reconfiguration decision made in the unit, selecting a configuration mode from the unit in the device, deprogramming the programmable components of the unit under the control of the device, and configuring the programmable components in accordance with the data of the selected configuration mode under the control of the device and utilizing the saved data of the operating context for the selected configuration mode.

Thus, according to the invention, if the user of the unit, which is of mobile telephone type, wishes to change configuration mode, i.e. to change radio communication interface, the electronic device, which is preferably portable and removable from the unit, deletes all the data and programs in the programmable components of the unit that are not necessary for the selected new configuration mode and supplies to the unit all the data that is necessary for it to operate in the selected configuration mode.

Thus the mobile telephone unit is able to operate in the selected configuration mode only if the device supplies to it the data of the selected mode.

Saving the operating context in the unit following a reconfiguration decision in the unit precedes the step of selecting a configuration mode. This enables the user of the unit to recover certain data and programs that are specific to the operation of the unit and/or the context of the unit and are independent of the configuration modes.

The electronic device provided preferably initially contains hardware and software characteristics of the unit relating in particular to each of the programmable components. These characteristics of the unit are necessary for acquiring the program and the parameters of each configuration mode best adapted to the architecture of the unit defined by said unit characteristics. The data, such as program and parameters of a selected mode, is downloaded into the electronic device by executing the following steps:

connecting the device to downloader means, transmitting an identifier of a configuration mode and the unit characteristics read in the device from the downloader means to a server, analyzing the unit characteristics in the server in order to select therein data defining the configuration mode designated by the identifier which data is most adapted to the unit characteristics, and transmitting the identifier and the selected configuration mode data from the server to the downloader means in order to write the identifier and the configuration mode data into the device.

After subsequently downloading the selected configuration mode data into the downloader means in the terminal, the electronic device is no longer involved in the operation of the terminal.

The invention also relates an electronic device carrying out the method of the invention for reconfiguring an electronic unit of cellular mobile telephone type comprising programmable components. The device is characterized in that it comprises memory means for storing data defining a plurality of respective configuration modes of the unit relating to radio communication interfaces, and control means for deprogramming the programmable components and configuring the programmable components according to the data of a mode selected from the configuration modes read in the memory means, operating context data that was saved in the unit after a reconfiguration decision in the unit being used for the selected configuration mode.

To download data defining configuration modes, the device comprises preferably memory means for storing hardware and software characteristics of the unit.

BRIEF DESCRIPTION OF THE DRAWINGS

Other features and advantages of the present invention will become more clearly apparent on reading the following description of several preferred embodiments of the invention given with reference to the corresponding appended drawings, in which.

DESCRIPTION OF THE PREFERRED EMBODIMENTS

Figure 1:
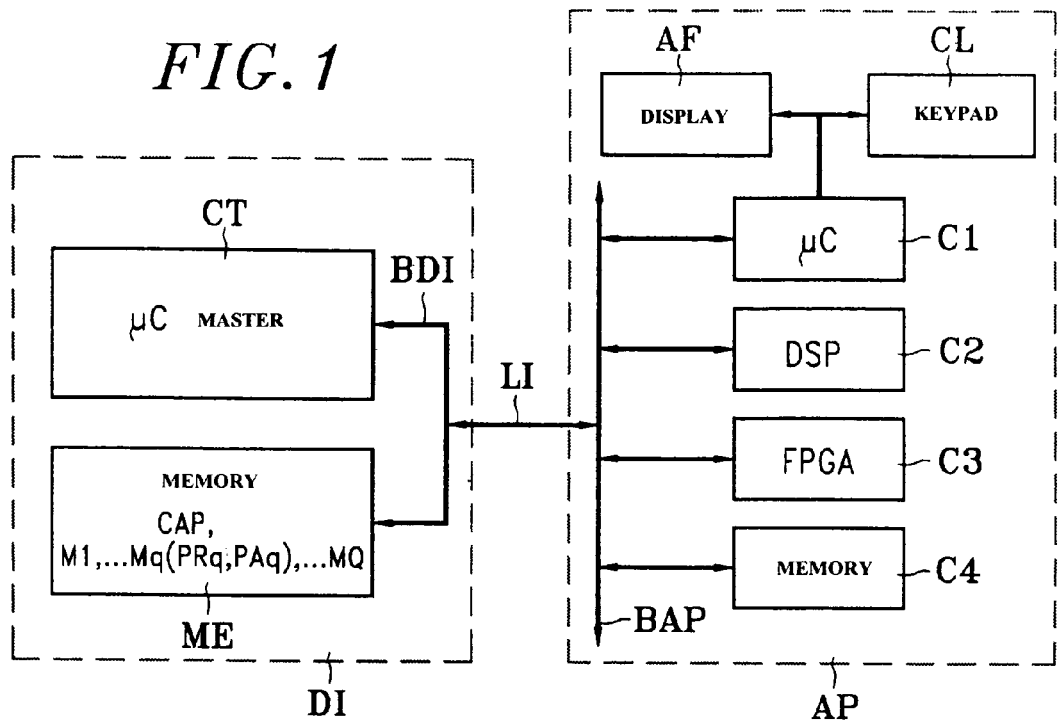
FIG. 1 is a schematic block diagram of an electronic unit with programmable components connected to a reconfiguration device of the invention.

An electronic unit AP such as a mobile cellular telephone terminal having components that are programmable in accordance with configuration modes is shown in FIG. 1.

The unit AP generally comprises four types of programmable components C1 to C4.

There is generally only one first component C1 that constitutes a microcontroller to manage activation and operation of the unit AP. The first component C1 is connected to a user interface including a display AF and a keypad CL and manages the communication link and the management of the communication resource during communication with a distant terminal, as well as the electrical power supply.

One or more second components C2 consist of digital signal processors (DSP). Each DSP is usually dedicated to signal processing tasks and its operation is controlled by the microcontroller C1. For example, one or more DSP may be dedicated to a communication or radio communication interface and also carry out the operations necessary for coding-decoding and sending-receiving data.

The components of the third type C3 are sequential and combinatorial field programmable gate array (FPGA) logic circuits, certain of which may constitute slave coprocessors of the DSP processors C2.

The fourth component type C4 relates to reprogrammable memories.

Depending on what type of unit the unit AP constitutes, it comprises one or more of the programmable components C1 to C4. At the minimum, a unit AP comprises a microcontroller C1, where applicable with a reprogrammable memory C4. All the components C1 to C4 are connected by a conventional bus BAP internal to the unit AP. The unit therefore behaves as a programmable multiprocessor system.

FIG. 1 also shows a portable electronic device DI for configuring the unit AP. The device DI essentially comprises a microcontroller CT and memories ME that are connected by a bus BDI. The bus BDI of the device DI is connected to the bus BAP of the unit AP by a link LI which may be a cable link, a universal serial bus (USB) link, a Bluetooth short-range radio link or any other contactless link. For example, the device DI is a small integrated circuit module or a microcontroller card, also known as a smart card, and is built into the unit AP or plugged into it and therefore removable from it.

In the context of the invention, the memory ME contains data relating to the hardware and software characteristics CAP of the unit AP and to configuration modes M1 to MQ of the unit AP.

The characteristics CAP of the unit relate equally to its hardware resources and its software resources. The hardware characteristics are, for example, the model, the manufacturer, the type and the serial number of each of the components C1 to C4, the number of components of the same type, the size of each of the memories C4, the clock frequencies of the components C1 and C2, etc. The characteristics CAP also relate to the software resources of the unit AP and in particular to the versions of the operating system and the various programs, applications and libraries implemented in the components of the unit AP, the interdependence thereof, etc. The entirety of the hardware and software characteristics CAP constitutes a signature of the architecture of the unit AP that is used to download configuration modes into the device DI, as explained in the remainder of the description.

Each configuration mode Mq, where $1=q=Q$, is defined by a specific program PRq and parameters PAq for configuring each of the programmable components C1 to C4 in the unit AP in the mode Mq. For a cellular mobile telephone unit AP, the configuration modes relate to radio communication interfaces compatible with a Digital Enhanced Cordless Telephone (DECT), Personal Handyphone System (PHS), Radio Local Area Network (RLAN) or HYPERLAN, or a Global System for Mobile communications (GSM), Advanced Mobile Phone System (AMPS) or Universal Mobile Telecommunication System (UMTS) local telephone network, or a radio communication network using non-geostationary satellites in low Earth orbit. These configuration modes relating to radio communication interfaces may be combined with different operating systems to be implemented in the microcontroller C1 and the processors C2 or with different services.

Figure 2:
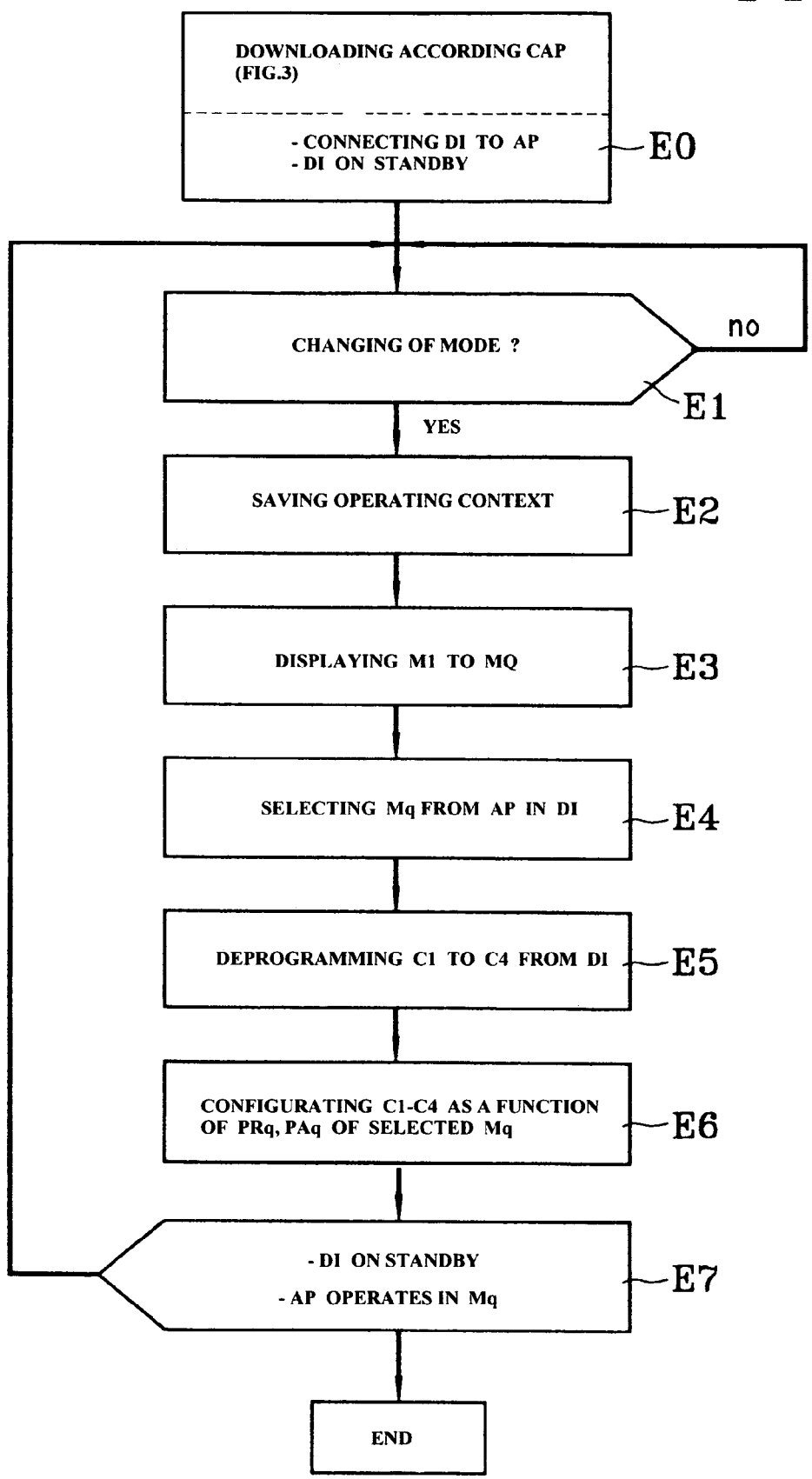
FIG. 2 shows an algorithm executing steps of the reconfiguration method of the invention.

The method of reconfiguring the mobile telephone unit AP according to the invention essentially comprises the main steps E0 to E7 depicted in FIG. 2.

It is assumed that in the initial step E0 the unit AP is in a predetermined configuration mode, and the device DI is connected to the unit AP and is on standby. All the programmable components C1 to C4 of the unit AP have been configured to carry out all the tasks associated with the predetermined configuration mode, whether those tasks are linked to baseband processing or to protocol layers, for example. In the standby state, the device DI is not involved in the operation of the unit AP and, if it has no autonomous electrical power supply, it is supplied with power by the power supply of the unit AP via the link LI.

It is also assumed that the memory ME of the device DI contains the programs PR1 to PRQ and the parameters PA1 to PAQ for a plurality of configuration modes M1 to MQ.

To change configuration mode, in the step E1, the user of the unit AP selects a configuration menu from a main menu present on the display AF of the unit AP. Display on the display AF of the unit and selection by the user may take the conventional form of voice messages.

If the mode configuration menu is selected in the step E1, the unit AP goes to standby, i.e. in the step E2 the components C1 to C3 command saving of the data of the current operating context of the unit AP in the memories C4 in order to retrieve the data after the mode change, in a subsequent step E7.

Starting from the step E2, the microcontroller CT in the device DI is activated and takes control of the DI/AP combination to install the configuration mode to be selected. In other words, all operations effected in subsequent steps are controlled by the microcontroller CT either directly or through the intermediary of the microcontroller C1 or one of the digital signal processors C2 that in this case operates as slave of the microcontroller CT.

In the step E3, the display AF offers the list of configuration modes M1 to MQ stored in the memory ME of the device DI, in the form of their names, where applicable accompanied by certain of the characteristics CAP. The user validates a selection of one Mq from the displayed configuration modes, using the keypad CL, for example, in order for the microcontroller C1 to communicate an identifier of the selected mode to the microcontroller CT of the device DI in the step E4.

The subsequent steps E5 and E6 are managed automatically by the microcontroller CT and are transparent to the user. In the step E5, the microcontroller CT controls deactivation of the programmable components C1 to C4 in the unit AP, i.e. partial or total deprogramming of one or more components in such a manner as to reset program memories in the components C1 and C2 and where applicable in the programmable circuits C3 and C4. The deprogramming in the step E5 depends on a comparison of the preceding predetermined configuration mode that must be eliminated and the new configuration mode Mq that has just been selected. Then, in the step E6, the microcontroller CT of the device DI reconfigures the components C1 to C4 of the unit AP as a function of the parameters PAq of the selected mode Mq by way of particular operations commanded and monitored by the corresponding program PRq. In particular, the parameters PAq are loaded into the programmable areas of the components C1 to C4 in place of the parameters of the preceding predetermined configuration mode, which were deleted in the step E5.

In the step E7, the device DI returns automatically to the standby state and becomes inactive vis-à-vis the unit AP, which at this stage is able to operate in the selected configuration mode Mq. The unit AP retrieves the data relating to the operating context saved in the memories C4 in order to use them in the configuration mode Mq.

The data PRq and PAq defining a configuration mode Mq is downloaded into the memory ME of the portable device DI, as indicated by the initial step EO in FIG. 2.

Figure 3:
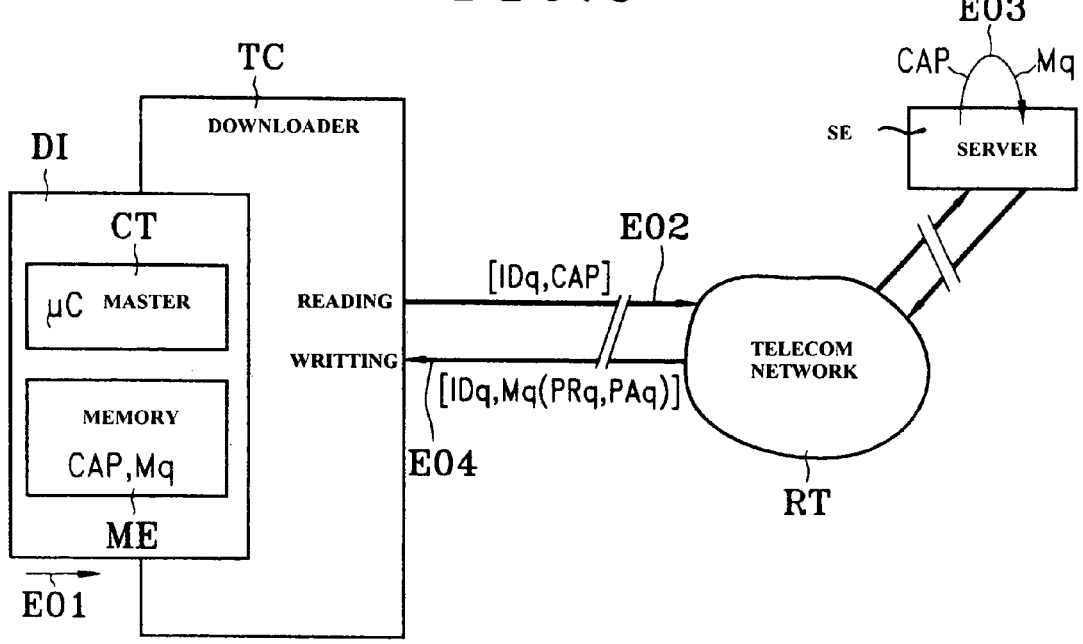
FIG. 3 is a schematic block diagram of a system for downloading configuration mode data into the reconfiguration device.

For example, the data PRq and PAq is included in a packet in the form of an applet written in the object-oriented language JAVA. The device DI is inserted into a downloader terminal TC that communicates with a server SE via a telecommunication network RT of the Internet type, as shown in FIG. 3. The downloader terminal contains an application dedicated to configuration mode downloading.

Downloading the data PRq and PAq of a predetermined configuration mode Mq into the device DI comprises four main steps E01 to E04.

In the step E01, after connection of the device DI to the downloading terminal TC, the user enters in the terminal TC an identifier IDq of the mode Mq to be written in memory ME of the device DI and subsequently installed in the architecture of the unit AP. In the step E02, the terminal TC produces and sends to the server SE an Internet protocol (IP) packet addressed to the server SE and containing the identifier IDq of the selected mode Mq and the characteristics CAP of the architecture of the unit AP, which are read by the downloader terminal TC in the memory ME of the device DI.

As a function of the hardware and software characteristics CAP in the packet received by the server SE, the latter decides on the best choice of the data PRq and PAq for the mode designated by the identifier IDq and reads the data PRq and PAq in a database associated with the server SE in the step E03. The server SE contains characteristics of diverse configuration modes that are updated either by the suppliers of units AP and the programmable components C1 to C4 or by telecommunication network operators. According to the analysis of the unit characteristics effected by the server, the latter returns to the downloader terminal TC an IP packet comprising the mode identifier IDq and the data PRq and PAq of the selected configuration mode Mq that are the most adapted to the unit architecture defined by the received characteristics CAP, or where applicable a packet indicating that there is no configuration of the mode Mq which can be adapted to the architecture of the unit AP in accordance with the characteristics CAP. The data PRq and PAq is then written by the downloader terminal TC into the memory ME of the device DI in corresponding relationship with the mode identifier IDq.

If a mode reconfiguration is subsequently requested in the step E1, the microcontroller C1 of the unit AP reads in the memory ME the identifier IDq of the mode Mq that has just been downloaded into the device DI so that it may be selected in the steps E3 and E4. During subsequent operation of the terminal with the data of the selected configuration mode, the electronic device is no longer involved in the operation of the terminal.

In practice, the downloader terminal TC may constitute a public downloader terminal just like a bank terminal or other service terminal made available to the public.

Alternatively, the downloader terminal TC and the unit AP receiving the device DI may be one and the same. In this variant, the application dedicated to downloading configuration mode data is installed in the device DI whose microcontroller CT controls exchange of packets with the server SE via the unit AP, which is transparent to the content of the packets.

The invention claimed is:

1. A method of reconfiguring an electronic unit of a cellular mobile telephone including components programmable in configuration modes relating to radio communication interfaces, the method being performed with the aid of an electronic device holding stored data defining a plurality of configuration modes, the method comprising the steps of
connecting said device to said unit,
saving operating data specific to the operation of said unit and context data in said unit following a reconfiguration decision made in said unit,
selecting a configuration mode from said unit in said device to thereby acquire said selected configuration mode as a function of hardware and software characteristics of said unit,
after the saving step has been performed, deprogramming said programmable components of said unit according to data of said selected configuration mode under the control of said device,
configuring said programmable components in accordance with the data of the selected configuration mode under the control of said device and utilizing the saved unit operating and context data for said selected configuration mode, said device including a memory storing hardware and software characteristics of said unit,
connecting said device to a downloader arrangement,
transmitting an identifier of a configuration mode and said unit characteristics read in said device from said downloader arrangement to a server,
analyzing said unit characteristics in said server in order,
selecting the server data defining said configuration mode designated by said identifier, which data is most adapted to said unit characteristics, the selecting step being in response to the analyzing step, and
transmitting said identifier and selected configuration mode data from said server to said downloader arrangement, writing said identifier and said selected configuration mode data into said device in response to the transmitted identifier and selected configuration mode data.

2. The method according to claim 1, wherein said downloader arrangement and said unit are one and the same.

* * * * *